United States Patent [19]

Waldron et al.

[11] Patent Number: 5,298,061
[45] Date of Patent: Mar. 29, 1994

[54] GEL-FREE PAINT CONTAINING ZINC PYRITHIONE, CUPROUS OXIDE, AND AMINE TREATED ROSIN

[75] Inventors: Craig Waldron, Waterbury; Douglas A. Farmer, Jr., Madison; Rahim Hani, Cheshire, all of Conn.

[73] Assignee: Olin Corporation, Cheshire, Conn.

[21] Appl. No.: 61,124

[22] Filed: May 14, 1993

[51] Int. Cl.⁵ ............................................. C09D 5/14
[52] U.S. Cl. ...................... 106/18.33; 106/16; 106/18.34; 504/121; 424/78.09; 523/122; 514/188; 514/345; 514/494
[58] Field of Search ............ 106/15.05, 16, 18.33, 106/18.34; 514/188, 345, 494; 504/121; 424/78.09; 523/122

[56] References Cited

U.S. PATENT DOCUMENTS

| | | | |
|---|---|---|---|
| 3,615,744 | 10/1971 | Yokoo et al. | 106/15.05 |
| 4,039,312 | 8/1977 | Patru | 106/16 |
| 4,581,351 | 4/1986 | Berke et al. | 514/345 |
| 4,918,147 | 4/1990 | Yamamori et al. | 424/78.09 |
| 5,057,153 | 10/1991 | Ruggiero | 106/18.33 |
| 5,098,473 | 3/1992 | Hani et al. | 106/18.33 |
| 5,112,397 | 5/1992 | Farmer, Jr. et al. | 106/18.33 |
| 5,137,569 | 8/1992 | Waldron et al. | 106/18.33 |
| 5,185,033 | 2/1993 | Hani et al. | 106/18.33 |
| 5,232,493 | 8/1993 | Waldron et al. | 106/18.33 |

FOREIGN PATENT DOCUMENTS 0108634 6/1984 European Pat. Off. .
0289481 11/1988 European Pat. Off. .
WO91/14743 10/1991 PCT Int'l Appl. .

*Primary Examiner*—Mark L. Bell
*Assistant Examiner*—Anthony J. Green
*Attorney, Agent, or Firm*—Dale L. Carlson

[57] ABSTRACT

The present invention relates generally to paints and paint bases, and, more specifically to a process and composition for providing a stable gel-free dispersion of zinc pyrithione plus cuprous oxide biocide in paint. In accordance with the process of the present invention, the paint or paint base contains an amine treated wood rosin in order to impart desired gelation-inhibition to the paint.

10 Claims, No Drawings

GEL-FREE PAINT CONTAINING ZINC PYRITHIONE, CUPROUS OXIDE, AND AMINE TREATED ROSIN

FIELD OF THE INVENTION

The present invention relates generally to paints and paint bases, and, more specifically to a process for providing a stable, gel-free dispersion of zinc pyrithione plus cuprous oxide biocide in paint.

BACKGROUND OF THE INVENTION

Combinations of zinc pyrithione and cuprous oxide are known to be excellent antifouling agents when formulated into paints and paint bases (i.e., the paint before pigment addition) also containing rosin, as disclosed, for example, in U.S. Pat. No. 5,057,153. Unfortunately, however, such paints have now been found to thicken or gel unacceptably within a few days, at best, or a few hours, at worst, when formulated with typical commercial grades of zinc pyrithione in combination with cuprous oxide.

Heretofore, the only solutions to the problem of gellation of paints containing rosin and zinc pyrithione in combination with cuprous oxide, known to the present inventors, have been to use rigorously purified zinc pyrithione, as disclosed in U.S. Pat. No. 5,098,473, or to add amines or esterified rosin, as disclosed in co-pending U.S. Pat. No. 5,112,397. Others solutions include the use of metal salts of wood rosin as disclosed in U.S. Pat. No. 5,137,569, and the addition of a desiccant as disclosed in U.S. Pat. No. 5,232,493.

Since these solutions may have drawbacks such as increased cost or lack of compatibility with some paints, a new, economical solution to the problem would be highly desired by the paint manufacturing community in order to maximize flexibility in using this combination of biocides in view of its excellent biocidal activity.

SUMMARY OF THE INVENTION

In one aspect, the present invention relates to a process for providing a gellation-inhibited solvent-based paint or paint base containing zinc pyrithione and cuprous oxide which comprises the steps of:

(a) incorporating said zinc pyrithione and also incorporating cuprous oxide into a solvent-based paint or paint base to provide a biocide-containing paint or paint base, said zinc pyrithione being present in an amount of between about 1% and about 25% (preferably 5–25%, more preferably 10–25%), and said cuprous oxide being present in an amount of between about 20% and about 70%, the total amount of said pyrithione salt plus said cuprous oxide being between about 20% and about 80%, said weight percents being based upon the total weight of the biocide-containing paint or paint base, and (b) incorporating a rosin amine or rosin amide or a mixture of said amine or said amide plus underivatized rosin into said biocide-containing paint or paint base, said rosin amine and said rosin amide being the reaction product(s) of a carboxylic acid-containing rosin (also referred to herein as "underivatized" rosin) with an amine where the carboxylic acid group on the rosin is now $CH_2NR_1R_2$ where $R_1$ and $R_2$ are the same or different being H or $C_1$ to $C_8$ alkyl, alkenyl, alkynyl, cycloakyl, cycloalkenyl, or cycloalkynyl.

The rosin amine or rosin amide is the reaction product of a carboxylic acid-containing rosin with an amine where the carboxylic acid group on the rosin is converted to $CONR_1R_2$ where $R_1$ and $R_2$ are the same or different being H or $C_1$ to $C_8$ alkyl, alkenyl, alkynyl, cycloakyl, cycloalkenyl, or cycloalkynyl, each optionally having pendant hydroxyl or amino functionality. The rosin mixture has a total acidity as measured by acid number of not greater than 70 (preferably between 0.1 and 50, more preferably between 0.1 and 30), and the rosin amine or rosin amide or mixture of said amine or said amide plus underivatized rosin is present in a total amount of between about 1% and 20% (preferably 2–15%, more preferably 4–10%), based upon the total weight of the paint or paint base, in order to form a paint or paint base characterized by enhanced biocidal efficacy and resistance to gelation.

In another aspect, the present invention relates to the above process wherein steps (a) and (b) are conducted simultaneously to provide the desired paint or paint base stabilized against gelation.

In another aspect, the present invention relates to a paint or paint base composition characterized by enhanced biocidal efficacy and gelation resistance wherein the paint of paint base contains a biocide consisting essentially of cuprous oxide and zinc pyrithione and wherein the paint or paint base is stabilized against gelation by virtue of the presence therein of the above-described rosin amine or rosin amide or mixture of said amine or said amide and underivatized rosin.

These and other aspects of the invention will become apparent upon reading the following detailed description of the invention.

DETAILED DESCRIPTION OF THE INVENTION

In accordance with the present invention, it has now been surprisingly found that the use of a rosin amine or a rosin amide, the structures of which are described hereinabove, provides stability against gelation of a solvent-based paint or solvent-based paint base containing a biocide consisting essentially of cuprous oxide and zinc pyrithione. As used herein, the term "rosin" refers to the natural product corresponding to the residue left after distilling off the volatile oils from resin obtained from various species of pine trees. It is offered commercially as "wood rosin" when obtained from stumps of such trees and as "gum rosin" when obtained from incisions in the living tree. It is also known as colophony or yellow resin. It consists substantially of isomers of abietic acid.

The mixture of rosin amine or rosin amide plus underivatized rosin useful in the present invention has an acid number as specified hereinabove. As used herein, the term "acid number" refers to the total acidity of the rosin amine or amide expressed in milligrams of potassium hydroxide per gram of sample as determined by titration of free acid groups in the sample with standard base. This analysis and analytical technique are well known to those skilled in the art.

Although the improved biocidal efficacy and gellation resistance advantages associated with the present invention are expected to provide advantages when used in a wide variety of paints, including indoor and outdoor household paints, industrial and commercial paints, particularly advantageous results are obtained when the process and composition of the present invention are utilized in conjunction with marine paints for use, for example, on ship's hulls. In addition, the composition and process of the present invention provides highly desirable results in the context of exterior paints of both the latex and alkyd types.

Typically, a paint composition will contain a resin, an organic solvent (such as xylene or methlisobutylketone), a pigment and various optional additives such as thickening agent(s), wetting agents, and the like, as is well-known in the art. The resin is preferably selected from the group consisting of vinyl, alkyd, epoxy, acrylic, polyurethane and polyester resins, and combinations thereof. The resin is preferably employed in an amount of between about 20% and about 80% based upon the weight of the paint or paint base.

In addition, the paint composition of the present invention optionally additionally contains optional additives which have a favorable influence on the viscosity, the wetting power and the dispersibility, as well as on the stability to freezing and electrolytes and on the forming properties. If a marine paint is being fabricated, the paint preferably contains a swelling agent to cause the paint to gradually "slough off" in its marine environment, thereby causing renewed biocidal efficacy of newly exposed biocide (i.e., the pyrithione salt plus the copper salt) at the surface of the paint in contact with the water medium of the marine environment. Illustrative swelling agents are naturally-occurring or synthetic clays, such as kaolin, montomorillonite bentonite), clay mica (muscovite), and chlorite (hectonite), and the like. In addition to clays, other swelling agents, including natural or synthetic polymers, such as that commercially available as POLYMERGEL, have been found to be useful in the compositions of the present invention to provide the desired "sloughing off" effect. Swelling agents can be used singly or in combination. The total amount of optional additives is preferably no greater than 20% by weight, more preferably between about 1% and about 5% by weight, based upon the total weight of the paint composition.

Illustrative thickening agents include cellulose derivatives, for example methyl, hydroxyethyl, hydroxypropyl and carboxymethyl cellulose, poly(vinyl alcohol), poly (vinylpyrolidone), poly(ethylene-glycol), salts of poly(acrylic acid) and salts of acrylic acid/acrylamide copolymers.

Suitable wetting and dispersing agents include sodium polyphosphate, aryl or alkyl phosphates, salts of low-molecular-weight poly(acrylic acid), salts of poly(ethane-sulfonic acid), salts of poly (vinyl-phosphonic acid), salts of poly(maleic acid) and salts of copolymers of maleic acid with ethylene, 1-olefins with 3 to 18 carbon atoms and/or styrene.

In order to increase the stability to freezing and electrolytes there may be added to the paint composition various monomer 1,2-diols, for example glycol, propylene-glycol-(1,2), and butylene-glycol-(1,2) or polymers thereof, or ethoxylated compounds, for example reaction products of ethylene oxide with long-chain alkanols, amines, carboxylic acids, carboxylic acid amides, alkyd phenols, poly(propylene-glycol) or poly(butylene-glycol).

The minimum temperature of film formation (white point) of the paint composition may be reduced by adding solvents, such as ethylene-glycol, butyl-glycol, ethyl-glycol acetate, ethyl-diglycol acetate, butyl-diglycol acetate, benzene or alkylated aromatic hydrocarbons. As defoaming agents there are suitable for example poly(propylene-glycol) and polysiloxanes.

The paint composition of the present invention may be used as a paint for natural or synthetic materials, for example wood, paper, metals, textiles and plastics. It is particularly suitable as an outdoor paint, and is excellent for use as a marine paint.

The invention is further illustrated by the following Examples. Unless otherwise stated, the "parts" and "%" are "parts by weight" and "percent by weight", respectively.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

COMPARATIVE EXAMPLE A

Demonstration of Gellation Results in a Paint Containing Cuprous Oxide Plus Zinc Pyrithione and Wood Rosin A paint was prepared using the following formulation:

The solvent mixture used was a 2:1 mixture of MIBK and xylene (called mixed solvent).

The zinc pyrithione used was standard commercial grade and assayed 97.8% pure by iodometric titration.

| Material | Parts | % |
| --- | --- | --- |
| VAGH resin (1) | 9.3 | 2.8 |
| DISPERBYK 163 (2) | 5.1 | 1.5 |
| Tributyl Phosphate | 6.45 | 2.0 |
| Cuprous Oxide | 136.5 | 41.4 |
| TITANOX (3) | 7.5 | 2.3 |
| Zinc pyrithione powder | 25.5 | 7.7 |
| Wood Rosin (4) | 6.3 | 1.9 |
| Solvent Mixture | 133.0 | 40.0 |

(1) vinyl chloride-vinyl acetate-vinyl alcohol terpolymer, a product of Union Carbide Corporation.
(2) a high molecular weight block copolymer, a product of BYK-Chemie.
(3) titanium dioxide, a product of DuPont Company.
(4) a product of Hercules, Incorporated The procedure employed for preparing the paint was as follows:
(1) A one pint paint can was charged with 41.93 g of a 22.2% VAGH resin solution in a 2:1 mixture by volume of MIBK and xylene.
(2) A mixture of 5.1 g Disperbyk 163 and 5.1 g mixed solvent was added.
(3) Tributyl phosphate was added to the paint can and mixed with a high speed disperser at 1000 RPM for 10 minutes.
(4) The cuprous oxide, zinc pyrithione, titanox, and 10.8 g carbitol acetate were added to the paint can and mixing was continued at 7000 RPM for 1 hr.
(5) The mixing speed was reduced to 2500 RPM and 35 g of mixed solvent was added.
(6) Once the temperature dropped from 45° C. to below 35°, a solution of 6.3 g of wood rosin in 50 g of mixed solvent was added to the can and the mixture was mixed for 1.0 hr. at 2500 RPM.

The paint formulation made according to this procedure was of suitable viscosity for application by brush immediately after preparation, but thickened to an unpourable paste after approximately 6 hours.

GENERAL PROCEDURE FOR MAKING ROSIN AMINE OR ROSIN AMIDE PAINTS

Mill Base (MB)

(1) A one pint paint can was charged with 35.2 g of a 22.2% VAGH resin solution in a 2:1 mixture by volume of MIBK and xylene.

(2) A mixture of 5.4 g Disperbyk 163 and 4.0 g mixed solvent was added to the can, along with 7.2 g of tricresyl phosphate.

(3) The above materials were mixed with a high speed disperser at 1000 RPM for 10 minutes.

Pigment Grind (PG)

(4) The cuprous oxide, zinc pyrithione, and 20.0 g solvent mixture (as needed) were added to the paint can and mixing was continued at 7000 RPM for 1 hour. The sample temperature was kept below 45° C. using a water bath.

Letdown Stage (LD)

(5) Next a solution of 14.5 g of the rosin amine or rosin amide in 25 g of mixed solvent was added to the can and the mixture was mixed for 1.0 hr at 4000 RPM.

(7) The solvent mixture which was lost during workup was added back to the paint and mixed for 5 minutes. Solvent mixture used was a 40% mixture of xylene and 60% MIBK.

EXAMPLE I

| Step | Material | Parts | % |
| --- | --- | --- | --- |
| MB | VAGH RESIN (22%) | 7.8 | 2.85 |
| MB | DISPERBYK 163 | 5.4 | 1.98 |
| PG | CUPROUS OXIDE | 150 | 54.86 |
| PG | ZINC PYRITHIONE | 13.5 | 4.94 |
| MB | TRICRESYL PHOSPHATE | 7.2 | 2.63 |
| LD | ROSIN AMINE D (1) | 14.5 | 5.30 |
| ALL | SOLVENT MIXTURE *60 MIBK/40% XYLENE | 75 | 27.43 |
|  | TOTAL | 273.4 | 100.00 |

(1) Dehydroabietylamine, a product of Hercules Incorporated. The carboxylic acid group on this rosin sample has been modified to $CH_2NH_2$ by Hercules.

The paint example I was of suitable viscosity for application by brush 5 months after its preparation.

EXAMPLE II

| Step | Material | Parts | % |
| --- | --- | --- | --- |
| MB | VAGH RESIN (22%) | 8.10 | 2.84 |
| MB | DISPERBYK 163 | 6.0 | 2.1 |
| PG | CUPROUS OXIDE | 150 | 52.53 |
| PG | ZINC OMADINE DRIED | 15.0 | 5.25 |
| MB | TRICRESYL PHOSPHATE | 7.2 | 2.52 |
| LD | ROSIN AMIDE(1) | 14.25 | 4.99 |
| ALL | SOLVENT MIXTURE *60 MIBK/40 XYLENE | 85.0 | 29.77 |
|  | TOTAL | 285.55 | 100.00 |

(1) Rosin amide in this example was made from the reaction of wood rosin with ethylenediamine at 120–140° C. The reaction was continued until one mole of water was removed per mole of ethylenediamine added.

The paint of example II thickened slightly but was still of suitable viscosity for application by brush 5 months after its preparation.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A paint or paint base composition characterized by enhanced biocidal efficacy and gelation resistance wherein the paint or paint base contains a biocide consisting essentially of cuprous oxide and zinc pyrithione, said zinc pyrithione being present in an amount of between about 1% and about 25%, and said cuprous oxide being present in an amount of between about 20% and about 70%, wherein the total amount of said zinc pyrithione plus said cuprous oxide is between about 20% and about 80%, based upon the total weight of the paint or paint base composition, wherein the paint or paint base additionally contains rosin amine or rosin amide in an amount sufficient to stabilize said paint or paint base against gelation, and wherein the amount of said rosin amine or rosin amide is between about 1% and 20% based upon the total weight of the paint or paint base composition.

2. A solvent-based paint or paint base composition characterized by enhanced biocidal efficacy and gelation resistance wherein the paint or paint base contains a biocide consisting essentially of cuprous oxide and zinc pyrithione, and the paint or paint base further comprises a rosin amine or rosin amide or mixture of rosin amine or rosin amide plus underivatized rosin, said mixture having a total acidity indicated by an acid number of not greater than 70, and said rosin amine or rosin amide or mixture of said rosin amine or said rosin amide plus underivatized rosin being present in a total amount of between about 1% and 20%, based upon the total weight of the paint or paint base, said zinc pyrithione being present in an amount of between about 1% and about 25%, and said cuprous oxide being present in an amount of between about 20% and about 70%, wherein the total amount of said zinc pyrithione plus said cuprous oxide is between about 20% and about 80%, based upon the total weight of the paint or paint base composition.

3. The paint or paint base of claims 1 or 2 which additionally contains a resin selected from the group consisting of vinyl, alkyd, epoxy, acrylic, polyurethane and polyester resins, and combinations thereof.

4. The paint or paint base of claims 1 or 2 which additionally contains a swelling agent selected from the group consisting of natural and synthetic clay and natural and synthetic polymer swelling agents.

5. A process for providing a gelation-inhibited solvent-based paint or paint base containing zinc pyrithione and cuprous oxide which comprises the steps of:
   (a) incorporating said zinc pyrithione and also incorporating cuprous oxide into a solvent-based paint or paint base to provide a biocide-containing paint or paint base, said zinc pyrithione being present in an amount of between about 1% and about 25%, and said cuprous oxide being present in an amount of between about 20% and about 70%, the total amount of said zinc pyrithione plus said cuprous oxide being between about 20% and about 80%, said weight percents being based upon the total weight of the biocide-containing paint or paint base, and (b) incorporating a rosin amine or rosin amide or a mixture of said amine or said amide plus underivatized rosin into said biocide-containing paint or paint base, said amine and said amide being the reaction product(s) of a carboxylic acid-containing rosin with an amine selected from the group with the formula of $(NH_2)_xRNH_2$, where x is 0 or 1 and R is H or $C_1$ to $C_8$ alkyl, alkenyl, alkynl, cycloalkyl, cycloalkenyl, or cycloalkynyl, each R group optionally having pendant hydroxyl or amino functionality, wherein the total amount of said rosin amine or rosin amide or mixture of rosin amine or rosin amide plus underivatized rosin is between about 1% and 20% based upon the total weight of the paint or paint base composition.

6. The process of claim 5 wherein the total amount of said zinc pyrithione plus said cuprous oxide is between about 20% and about 75% based upon the total weight of the paint or paint base composition.

7. The process of claim 5 wherein said composition additionally contains a resin selected from the group consisting of vinyl, alkyd, epoxy, acrylic, polyurethane and polyester resins, and combinations.

8. The process of claim 5 wherein said composition additionally contains a swelling agent selected from the group consisting of natural and synthetic clay and natural and synthetic polymer 5 swelling agents.

9. The process of claim 5 wherein steps (a) and (b) are carried out simultaneously.

10. The process of claim 8 wherein said swelling agent is selected from the group consisting of kaolin, montomorillonite (bentonite), clay mica (muscovite), and chlorite (hectonite), and combinations thereof.

* * * * *